(12) United States Patent
Fukasawa et al.

(10) Patent No.: US 11,391,354 B2
(45) Date of Patent: Jul. 19, 2022

(54) GEAR FOR DIFFERENTIAL AND DIFFERENTIAL

(71) Applicant: Hitachi Astemo, Ltd., Ibaraki (JP)

(72) Inventors: Kenji Fukasawa, Ibaraki (JP); Kenji Kato, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/184,552

(22) Filed: Feb. 24, 2021

(65) Prior Publication Data

US 2021/0180672 A1 Jun. 17, 2021

Related U.S. Application Data

(63) Continuation of application No. PCT/JP2019/003088, filed on Jan. 30, 2019.

(30) Foreign Application Priority Data

Jan. 21, 2019 (JP) .............................. JP2019-007925

(51) Int. Cl.
*F16H 48/38* (2012.01)
*F16H 48/08* (2006.01)
*F16H 55/17* (2006.01)

(52) U.S. Cl.
CPC ............. *F16H 48/38* (2013.01); *F16H 48/08* (2013.01); *F16H 55/17* (2013.01)

(58) Field of Classification Search
CPC ........... F16H 48/38; F16H 48/08; F16H 55/17
USPC ................................................. 475/231, 236
See application file for complete search history.

(56) References Cited

U.S. PATENT DOCUMENTS

| 6,432,020 | B1 * | 8/2002 | Rivera | ..................... F16H 48/08 475/231 |
| 7,425,185 | B2 * | 9/2008 | Donofrio | ............... H01F 7/1638 475/231 |
| 7,988,584 | B2 * | 8/2011 | Balenda, II | ............. F16H 48/30 475/236 |
| 8,167,764 | B2 * | 5/2012 | Balenda, II | ............. F16H 48/30 475/236 |

(Continued)

FOREIGN PATENT DOCUMENTS

| JP | H08-14360 A | 1/1996 |
| JP | 2004-068904 A | 3/2004 |

(Continued)

OTHER PUBLICATIONS

International Search Report and Written Opinion of the International Search Report for PCT/JP2019/003088 dated Mar. 5, 2019.

*Primary Examiner* — Derek D Knight
(74) *Attorney, Agent, or Firm* — Kenealy Vaidya LLP

(57) ABSTRACT

A differential gear accommodated in a differential case, includes: an axial cylinder having a cylindrical shape fitted onto a shaft; an annular wall having an annular shape protruding from an outer circumferential surface of the axial cylinder; a gear protruding from the annular wall on one side with respect to an axial direction of the shaft; a reinforcing rib protruding from an outer circumferential surface of the annular wall; and a first recess formed by boring the annular wall and opening the other side with respect to the axial direction of the shaft.

16 Claims, 9 Drawing Sheets

(56) References Cited

U.S. PATENT DOCUMENTS

| | | | | |
|---|---|---|---|---|
| 8,858,384 | B2 * | 10/2014 | Fusegi | .................... F16H 48/08 |
| | | | | 475/231 |
| 10,544,856 | B2 | 1/2020 | Yoshisaka et al. | |
| 10,663,052 | B2 * | 5/2020 | Balenda, II | ............. F16H 48/40 |
| 2015/0204431 | A1 * | 7/2015 | Cochren | ................. F16H 48/08 |
| | | | | 475/150 |
| 2016/0160981 | A1 * | 6/2016 | Balenda, II | ............. F16H 48/40 |
| | | | | 475/231 |

FOREIGN PATENT DOCUMENTS

| | | |
|---|---|---|
| JP | 2007-205365 A | 8/2007 |
| JP | 2017-203547 A | 11/2017 |
| JP | 2018-141549 A | 9/2018 |
| WO | 2020/152872 A1 | 7/2020 |

* cited by examiner

GEAR FOR DIFFERENTIAL AND DIFFERENTIAL

CROSS-REFERENCE TO RELATED APPLICATIONS

This application is a PCT Bypass Continuation application of and claims the priority benefit under 35 U.S.C. § 120 to PCT application No. PCT/JP2019/003088 filed on Jan. 30, 2019 and therefore also claims the priority benefit under 35 U.S.C. § 119 of Japanese Patent Application No. 2019-007925A filed on Jan. 21, 2019, the entire disclosures of which (both the PCT application No. PCT/JP2019/003088 and Japanese Patent Application No. 2019 007925A) are hereby incorporated in their entireties by reference.

TECHNICAL FIELD

The present invention relates to gears for a differential (differential gear) and a differential.

BACKGROUND OF THE INVENTION

An FF-based four-wheel drive car is mounted at a rear portion thereof with a final reduction gear. A driving force transmitted from a propeller shaft is reduced in speed by the final reduction gear and is transmitted to a right and left rear wheels. Further, the final reduction gear includes a differential which distributes and transmits a different rotation speed to each of the right and left rear wheels in the final reduction gear. The differential described above includes, as described in Patent literature 1, a differential case, a pinion shaft arranged in the differential case to be orthogonal to a rotating shaft of the differential case, a pair of differential pinion gears supported by the pinion shaft, and a pair of side gears meshing with the differential pinion gears.

PATENT LITERATURE

Japanese Patent Application Publication No. 2018-141549

SUMMARY OF THE INVENTION

The differential pinion gears and the side gears have high strength and are heavy. Therefore, reduction in weight of those gears have been desired.

The present invention is made to solve a problem as described above and provides a differential gear and a differential reduced in weight.

To solve the problem described above, a differential gear of the present invention is accommodated in a differential case, and includes: an axial cylinder having a cylindrical shape fitted onto a shaft; an annular wall having an annular shape protruding from an outer circumferential surface of the axial cylinder; a gear protruding from the annular wall on one side with respect to an axial direction of the shaft; a reinforcing rib protruding from an outer circumferential surface of the annular wall; and a first recess formed by boring the annular wall and opening on the other side with respect to the axial direction of the shaft.

The present invention has the differential gear reduced in weight by forming the first recess. Further, the reinforcing rib secures strength. Still further, the lubricating oil is stored in the first recess to be continuously supplied to a sliding portion (outer circumferential surface of the annular wall) and a meshing portion of the gears.

DETAILED DESCRIPTION OF PREFERRED EMBODIMENTS

Figure 1:
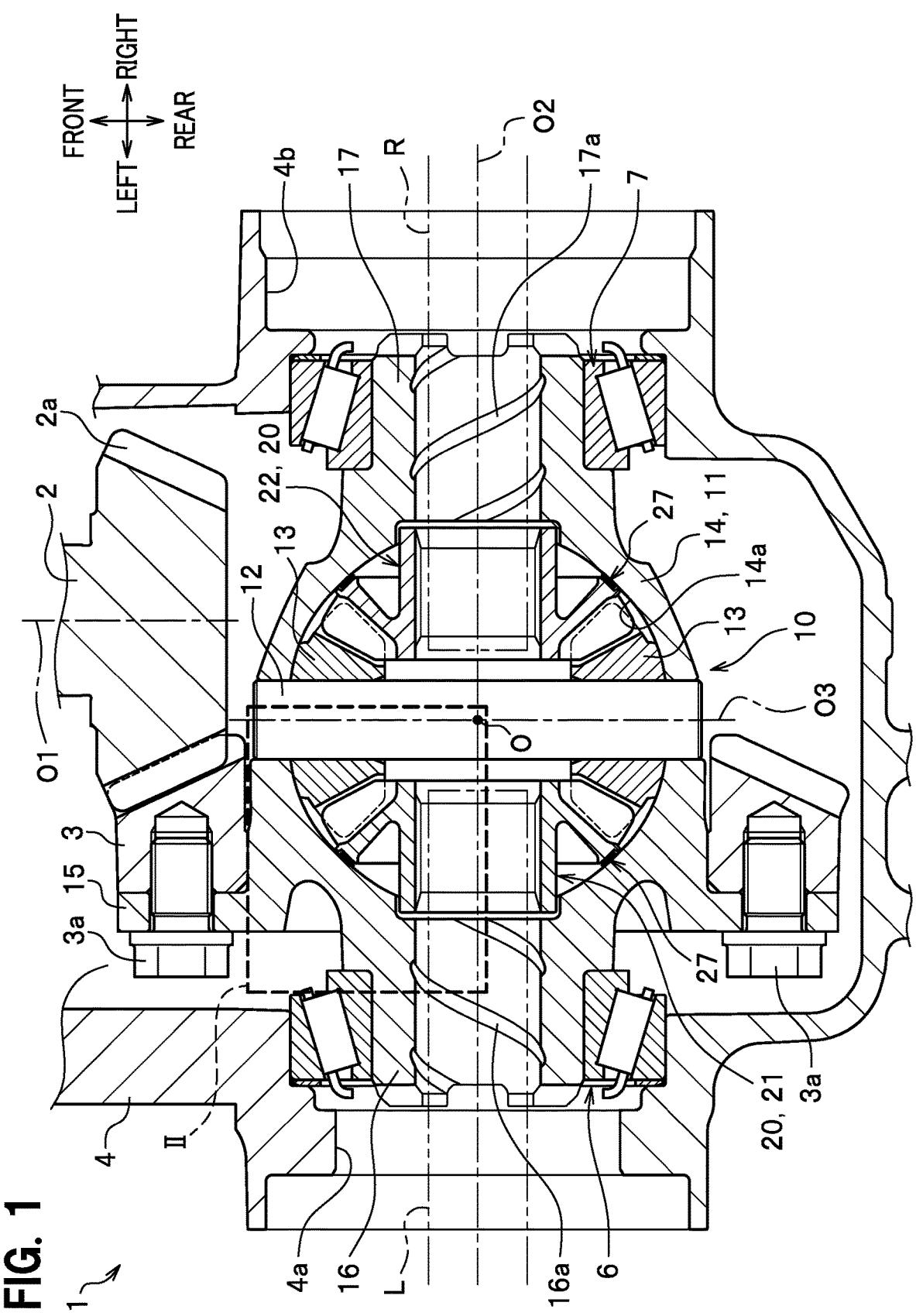
FIG. 1 is a plan view of a horizontal cross-section of a rear portion of a final reduction gear of a first embodiment.

Next, descriptions are given of final reduction gears including differentials of respective embodiments with reference to drawings. Elements common to the embodiments are denoted by the same reference numerals and descriptions thereof are omitted.

First Embodiment

A final reduction gear 1 is a device mounted on an FF-based four-wheel drive vehicle and reduces a driving force transmitted from a propeller shaft so as to transmit the driving force to right and left rear wheels.

As illustrated in FIG. 1, the final reduction gear 1 includes a drive pinion 2, a ring gear 3, a differential 10, and a housing 4 for accommodating these elements.

The drive pinion 2 is an element having a rod shape to rotate about an axis O1 extending in front/rear directions, and is formed at a rear portion thereof with a pinion gear 2a having a truncated cone-shape.

The ring gear 3 is an element having a ring shape to rotate about an axis O2 extending in left/right directions. The ring gear 3 is formed to have a larger diameter than a pinion gear 2a meshed therewith so as to reduce the driving force transmitted from the pinion gear 2a. The ring gear 3 is fastened with bolts 3a to a flange 15 of a differential case 11, to be described below, of the differential 10.

A lower portion of the housing 4 is stored with lubricating oil, and the ring gear 3 in rotation scoops up the lubricating oil to be scattered to the elements.

The differential 10 includes a differential case 11 to rotate about the axis O2, a pinion shaft 12 fixed to the differential case 11 and extending in a direction orthogonal to the axis O2, a pair of differential pinion gears 13 to rotate about the pinion shaft 12, a pair of side gears 20 to mesh with the pair of differential pinion gears 13, and a pair of washers 27 arranged on a radially outer side of the side gears 20.

The differential case 11 includes a differential case body 14 having a substantially spherical shape and opening to the axis O2, a flange 15 protruding from an outer circumferential surface of the differential case body 14, a cylindrical left boss 16 protruding from a left end of the differential case body 14, and a cylindrical right boss 17 protruding from the right end of the differential case body 14.

The differential case body 14 has an inner circumferential surface 14a having a substantially spherical shape about an intersection O between an axis O3 of the pinion shaft 12 and the axis O2.

The left boss 16 is supported by a left wall of the housing 4 via a left taper roller bearing 6. The left boss 16 has a left opening as an inlet through which the lubricating oil stored in the lower portion of the housing flows. Further, the left boss 16 has an inner circumferential surface in which a spiral groove 16a is formed, and the lubricating oil flowing into the left boss is guided by the spiral groove 16a to flow into the differential case body 14.

The right boss 17 is supported by a right wall of the housing 4 via a right taper roller bearing 7.

The right boss 17 has a right opening as an inlet through which the lubricating oil stored in the lower portion of the housing 4 flows. The right boss 17 has an inner circumferential surface in which a spiral groove 17a is formed, and the lubricating oil flowing into the right boss 17 is guided by the spiral groove 17a to flow into the differential case body 14.

Note that, the left wall of the housing 4 has a left through hole 4a at a portion facing the left boss 16. A left drive shaft (see an imaginary line L in FIG. 1) penetrates the left through hole 4a and the left boss 16 so that the right end thereof is positioned in the differential case body 14.

Likewise, the right wall of the housing 4 has a right through hole 4b at a portion facing the right boss 17. A right drive shaft (see an imaginary line R in FIG. 1) penetrates the right through hole 4b and the right boss 17 so that a left end thereof is positioned in the differential case body 14.

The pair of side gears 20 include a left-side gear 21 arranged on a left side of the pinion shaft 12 and a right-side gear 22 arranged on a right side of the pinion shaft 12. Further, both the left-side gear 21 and right-side gear 22 are formed in the same shape. A description is given below of the left-side gear 21 as an example, and a description of the right-side gear 22 is omitted.

Figure 2:
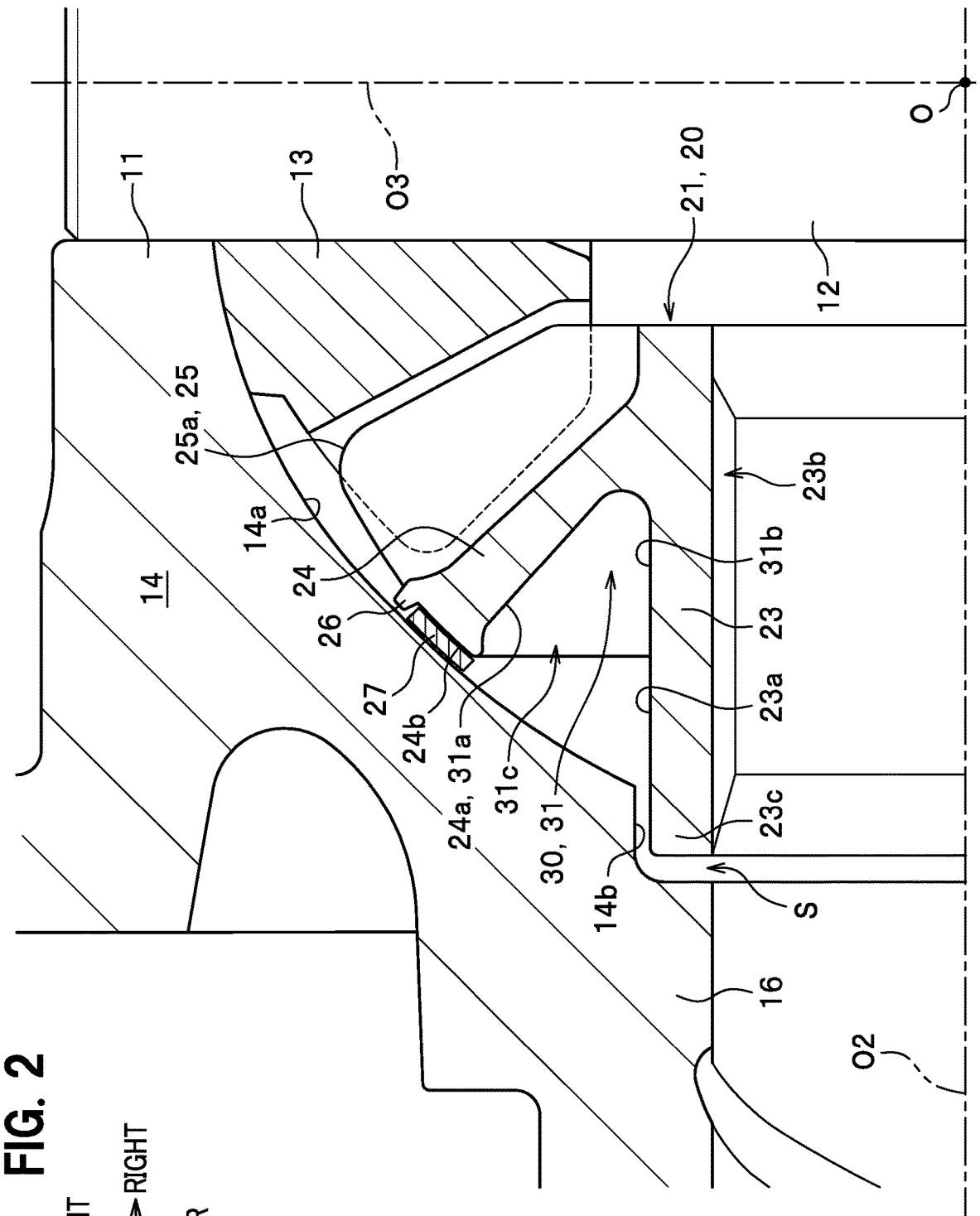
FIG. 2 is an enlarged view of a portion surrounded by a broken line II in FIG. 1.

As illustrated in FIG. 2, the left-side gear 21 is a forged product manufactured with a die, and includes a axial cylinder 23 in a shape of a cylinder about the axis O2, an annular wall 24 protruding from an outer circumferential surface 23a of the axial cylinder 23, a gear meshing with the differential pinion gear 13, a reinforcing rib 26 protruding from an outer circumferential surface 24b of the annular wall 24, and a recess 30 formed by boring the annular wall 24 or the gear 25. Note that the side gear 20 of the present invention is not limited to a forged product but may be manufactured by sintering.

The right end of the left drive shaft (see the imaginary line L in FIG. 1) is inserted into the axial cylinder 23. Further, the axial cylinder 23 has an inner circumferential surface having a spline groove 23b formed therein, to engage with a spline shaft (not shown) of the left drive shaft so as not to rotate relative to each other about the axis O2.

Note that the left boss 16 facing a left end 23c of the axial cylinder 23 is formed, at the right end thereof, with an enlarged-diameter groove 14b having a diameter larger than an inner diameter of the left boss 16, to accommodate the left end 23c of the axial cylinder 23. Further, the left end 23c of the axial cylinder 23 is separated from the enlarged-diameter groove 14b to have a gap S therebetween.

The annular wall 24 is a portion to support the gear 25.

The annular wall 24 is cross-sectionally inclined leftward with an increasing distance, radially outward, from the outer circumferential surface 23a of the axial cylinder 23. As a result, a space (first recess 31) having a substantially triangular shape in cross-section is defined between a left-side surface 24a of the annular wall 24 and the outer circumferential surface 23a of the axial cylinder 23. The first recess 31 is described in detail below.

Further, the outer circumferential surface 24b of the annular wall 24 faces the inner circumferential surface 14a of the differential case body 14 and has an arc shape.

Figure 3:
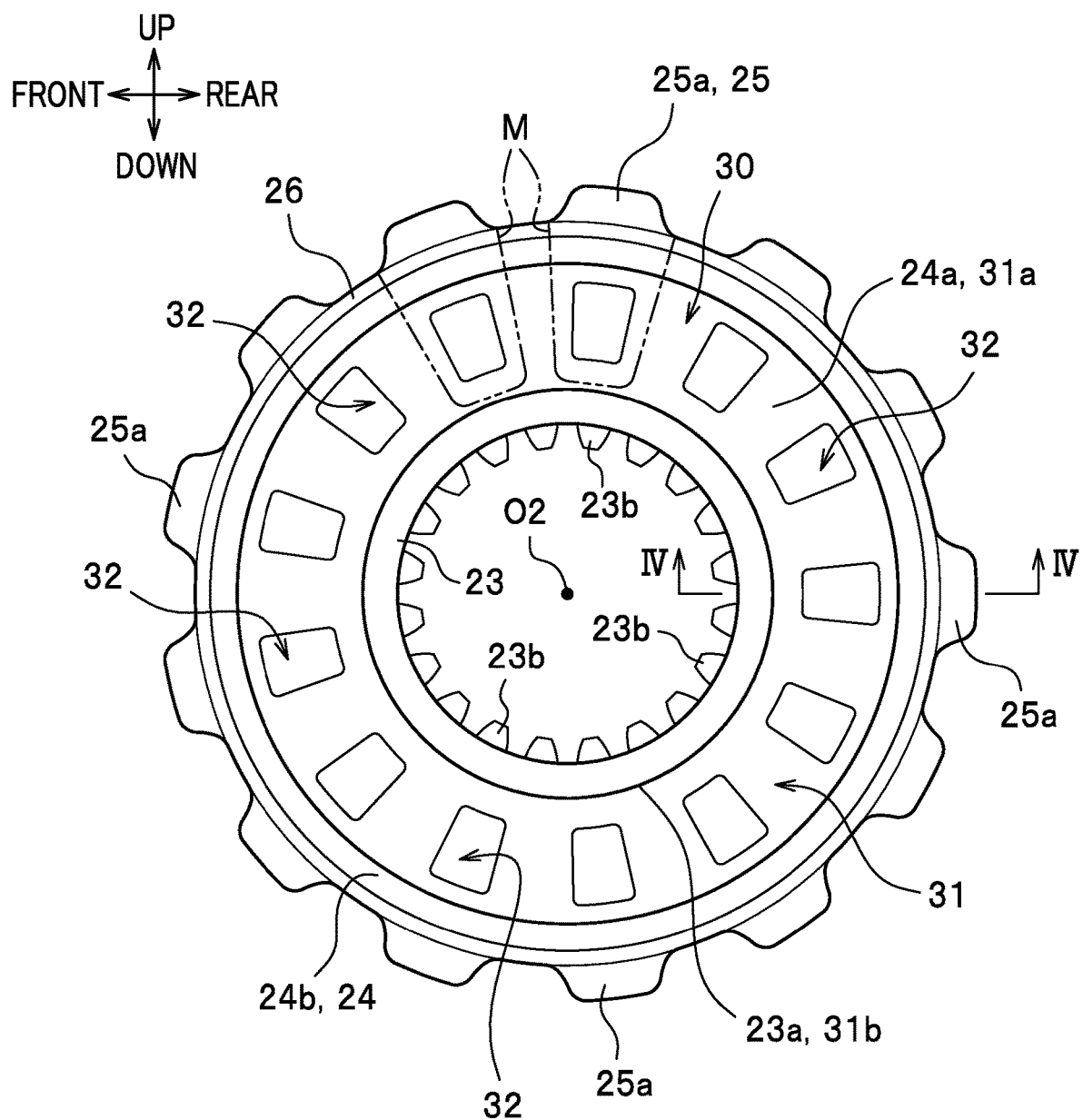
FIG. 3 is a left side view of a left-side gear of the first embodiment.

As illustrated in FIG. 3, the gear 25 has a plurality of teeth 25a formed in the circumferential direction about the axis O2. Note that an imaginary line M in FIG. 3 indicates an inner periphery (invisible portion covered by the annular wall 24) of each tooth 25a.

As illustrated in FIG. 2, the reinforcing rib 26 cross-sectionally has a substantially trapezoidal shape protruding from the outer circumferential surface 24b of the annular wall 24 toward the inner circumferential surface 14a of the differential case body 14. Further, the reinforcing rib 26 is formed at the right end of the outer circumferential surface 24b.

As illustrated in FIG. 3, the reinforcing rib 26 has a circular shape as viewed from the axis O2 and is continuous in the circumferential direction.

As illustrated in FIG. 2, the washer 27 is an annular metal element interposed between the outer circumferential surface 24b of the annular wall 24 and the inner circumferential surface 14a of the differential case body 14. The washer 27 has a thickness greater than a protrusion amount of the reinforcing rib 26 such that the reinforcing rib 26 does not abut (not slidably contact with) the inner circumferential surface 14a of the differential case body 14.

From the description above, when the driving force is transmitted to the final reduction gear 1 to rotate the differential case 11 about the axis O2, the left-side gear 21 receives a load which separates the left-side gear 21 leftward from the differential pinion gear 13 meshed with the gear 25. Therefore, the washer 27 is pressed by the outer circumferential surface 24b of the annular wall 24 against the inner circumferential surface 14a of the differential case body 14. Further, when the left-side gear 21 rotates relative to the differential case 11, the outer circumferential surface 24b of the annular wall 24 slides with respect to the washer 27, or the washer 27 slides with respect to the inner circumferential surface 14a of the differential case body 14. In other words, the outer circumferential surface 24b forms a sliding portion which slides with respect to the differential case 11. Note that, in the present embodiment, the washer 27 is interposed between the inner circumferential surface 14a of the differential case body 14 and the outer circumferential surface 24b, but the washer 27 may not be arranged in the present invention.

The recess 30 is a space formed by boring the annular wall 24, and has the first recess 31 (see FIG. 2) opening to the left side and a second recess 32 (see FIG. 4) which is further bored rightward from an inner surface of the first recess 31.

As illustrated in FIG. 3, the first recess 31 is continuous in the circumferential direction about the axis O2 to have an annular shape.

As illustrated in FIG. 2, the cross-sectional shape of the first recess 31 is a substantially triangular shape in a cross-sectional view, as described above. An outer circumferential surface 31a defining an outer circumference of the first recess 31 is formed by the left-side surface 24a of the annular wall 24 and is inclined radially outward toward an opening 31c. An inner circumferential surface 31b defining an inner circumference of the first recess 31 is formed by the outer circumferential surface 23a of the axial cylinder 23.

Further, the outer circumferential surface 23a of the axial cylinder 23 (including the inner circumferential surface 31b of the first recess 31) is formed flat in the axis O2 direction.

As illustrated in FIG. 3, the second recess 32 is formed to overlap the tooth 25a of the gear 25, as viewed from the axis O2 (see the imaginary line M in FIG. 3).

Figure 4:
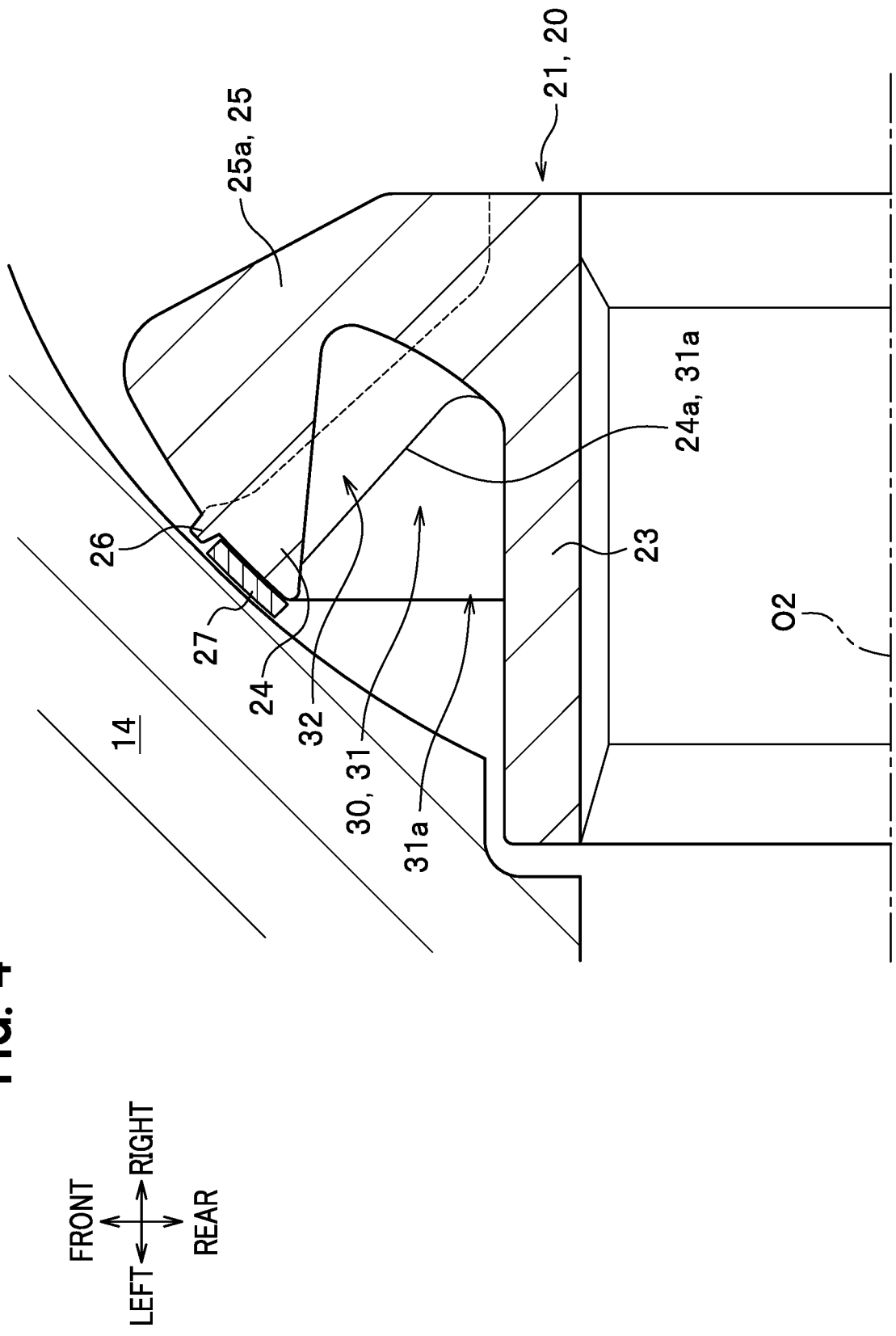
FIG. 4 is a cross-sectional view taken along a line IV-IV in FIG. 3.

As illustrated in FIG. 4, the second recess 32 extends rightward from the outer circumferential surface 31a of the first recess 31 (left-side surface 24a of the annular wall 24), and is a space formed by boring the tooth 25a. Further, the cross-sectional shape of the second recess 32 is a substantially triangular shape.

Figure 5:
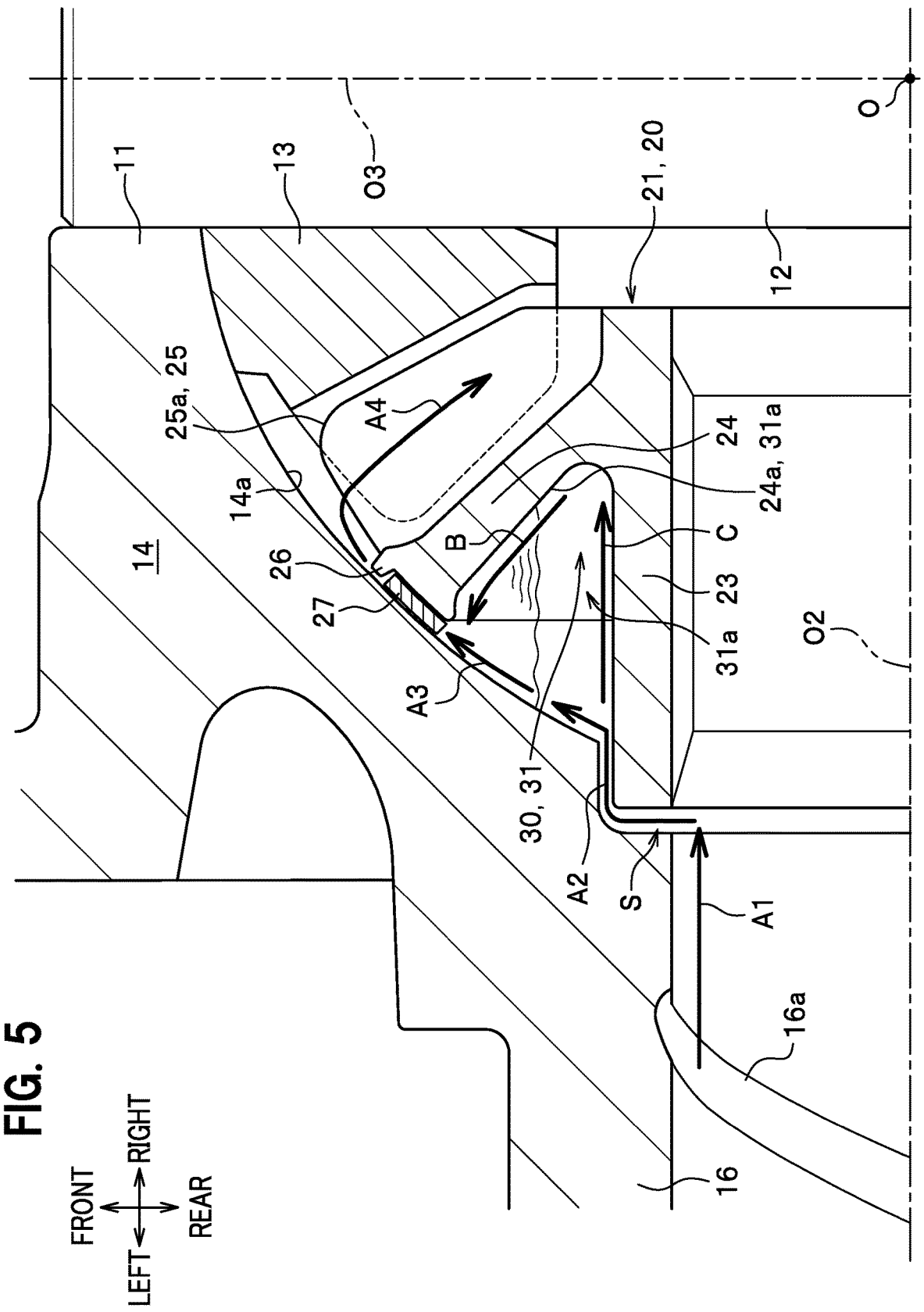
FIG. 5 is a schematic diagram for illustrating a flow path for lubricating oil in a differential.

Next, a description is given of a flow path for the lubricating oil with reference to FIG. 5.

When the left boss 16 rotates about the axis O2 due to rotation difference between the right and left wheels at different speeds, the lubricating oil flowed from the housing 4 (see FIG. 1) into the left boss 16 is guided rightward (toward the left-side gear 21) by the spiral groove 16a (see arrow A1).

The lubricating oil flowed out through the right opening of the left boss 16 flows in the gap S, caused by a centrifugal force acting radially outward with respect to the axis O2, to reach the inner circumferential surface 14a of the differential case body 14 (see arrow A2). Further, the centrifugal force is continuously acting on the lubricating oil so that the lubricating oil moves radially outward along the inner circumferential surface 14a of the differential case body 14 (see arrow A3).

Here, the washer 27 and the reinforcing rib 26 are interposed between the inner circumferential surface 14a of the differential case body 14 and the outer circumferential surface 24a of the annular wall 24, making the flow path narrow. Therefore, an amount of lubricating oil (see arrow A4), supplied to the gear 25 and the differential pinion gear 13 over the reinforcing rib 26, is limited.

As a result, the lubricating oil obstructed by the washer 27 and the reinforcing rib 26 is stagnated in a space surrounded by the inner circumferential surface 14a of the differential case body 14, the left-side surface 24a of the annular wall 24, and the outer circumferential surface 23a of the axial cylinder 23. Accordingly, the lubricating oil is stored in the first recess 31 and the second recess 32.

As described above, according to the first embodiment, the annular wall 24 is formed by boring the first recess 31 so that the pair of side gears 20 are reduced in weight as compared with the conventional side gears. Meanwhile, the annular wall 24 is strengthened by the reinforcing rib 26 to maintain predetermined strength.

Further, the lubricating oil is stored in the first recess 31. Therefore, the lubricating oil is continuously supplied to the sliding portion (outer circumferential surface 24b of the annular wall 24) or a meshing portion between the gear 25 of the side gear 20 and the differential pinion gear 13.

Each of the teeth 25a of the gear 25 is formed by boring the second recess 32 to be hollow so that the pair of side gears 20 are further reduced in weight. Further, the lubricating oil stored in the second recess 32 cools each tooth 25a from inside, resulting in excellent cooling performance.

As illustrated in FIG. 5, the outer circumferential surface 31a of the first recess 31 (left-side surface 24a of the annular wall 24) is inclined radially outward toward the opening 31c of the first recess 31. Therefore, when the centrifugal force acts, the lubricating oil stored in the first recess 31 moves toward the opening 31c along the outer circumferential surface 31a (see arrow B in FIG. 5). From the description above, the lubricating oil stored in the first recess 31 is actively supplied to the sliding portion (outer circumferential surface 24b of the annular wall 24) so that the lubricating oil is continuously supplied to the meshing portion between the gear 25 of the side gear 20 and the differential pinion gear 13.

Further, the outer circumferential surface 23a of the axial cylinder 23 is formed flat. Therefore, even when the lubricating oil moves rightward along the outer circumferential surface 23a, the lubricating oil moves smoothly (see arrow C in FIG. 5), to be stored in the first recess 31.

Further, the first recess 31 and second recess 32 have a triangular shape. Therefore, a mold used to form the first recess 31 and second recess 32 is easily pulled out leftward at the time of manufacturing, which simplifies the manufacturing.

Second Embodiment

Next, a description is given of a differential 110 of a second embodiment.

Figure 6:
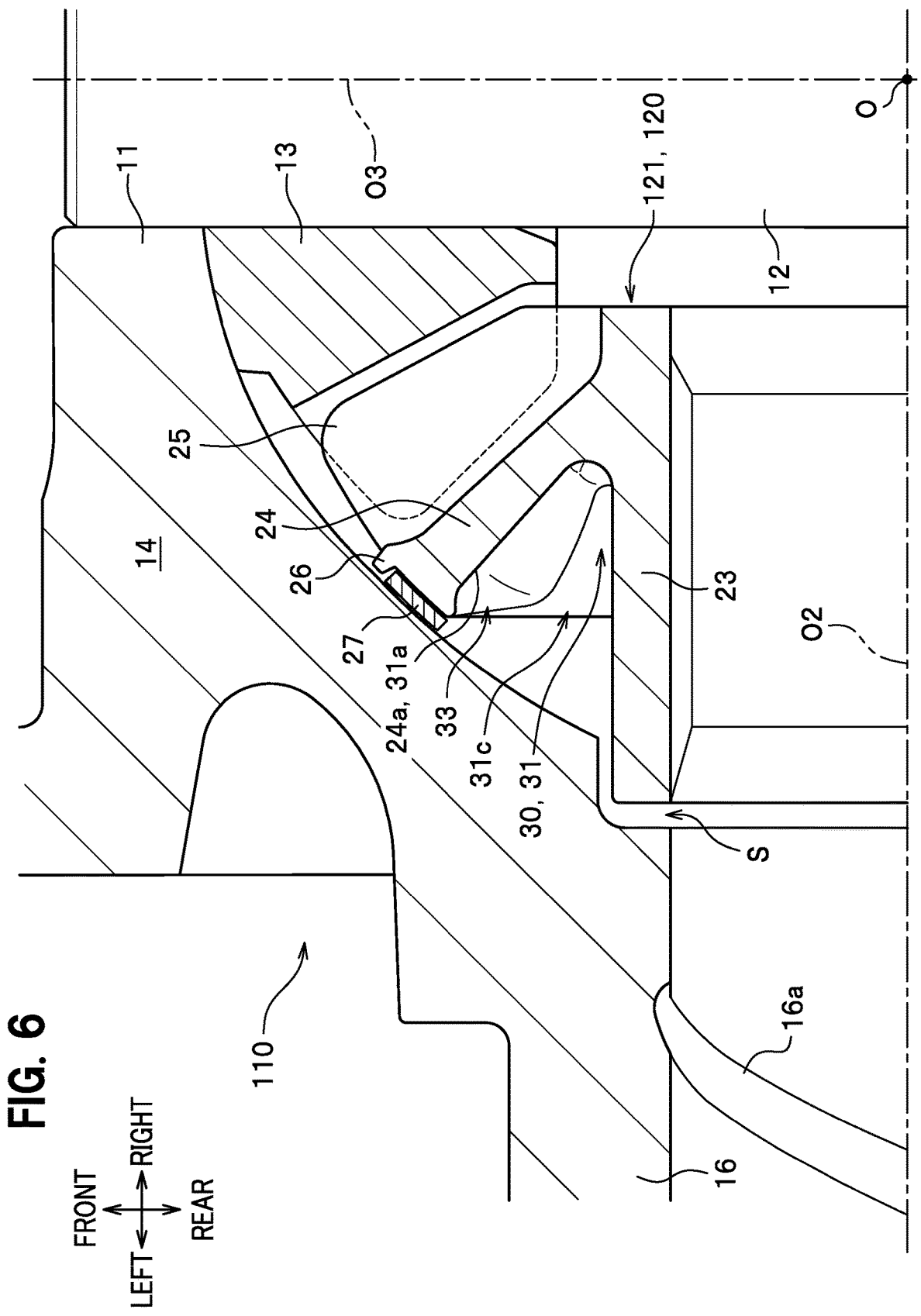
FIG. 6 is an enlarged cross-sectional view of a portion of the differential of a second embodiment, particularly, a cross-sectional view taken along a line VI-VI in FIG. 7.

As illustrated in FIG. 6, the differential 110 includes the differential case 11, the pinion shaft 12, the pair of differential pinion gears 13 (only one is shown), a pair of side gears 120 (only a left-side gear 121 is shown), and the pair of washers 27 (only one is shown). Note that the differential case 11, the pinion shaft 12, the pair of differential pinion gears 13, and the pair of washers 27 have been described in the first embodiment, and the descriptions thereof is omitted.

The left-side gear 121 includes the axial cylinder 23, the annular wall 24, the gear 25, the reinforcing rib 26, the recess 30 (first recess 31, second recess 32), and a plurality of guide ribs 33 protruding leftward from the left-side surface 24a of the annular wall 24. Note that the axial cylinder 23, the annular wall 24, the gear 25, the reinforcing rib 26, and the recess 30 (first recess 31, second recess 32) have been described in the first embodiment, and the descriptions thereof are omitted.

The guide rib 33 protrudes to the vicinity of the opening 31c of the first recess 31.

Figure 7:
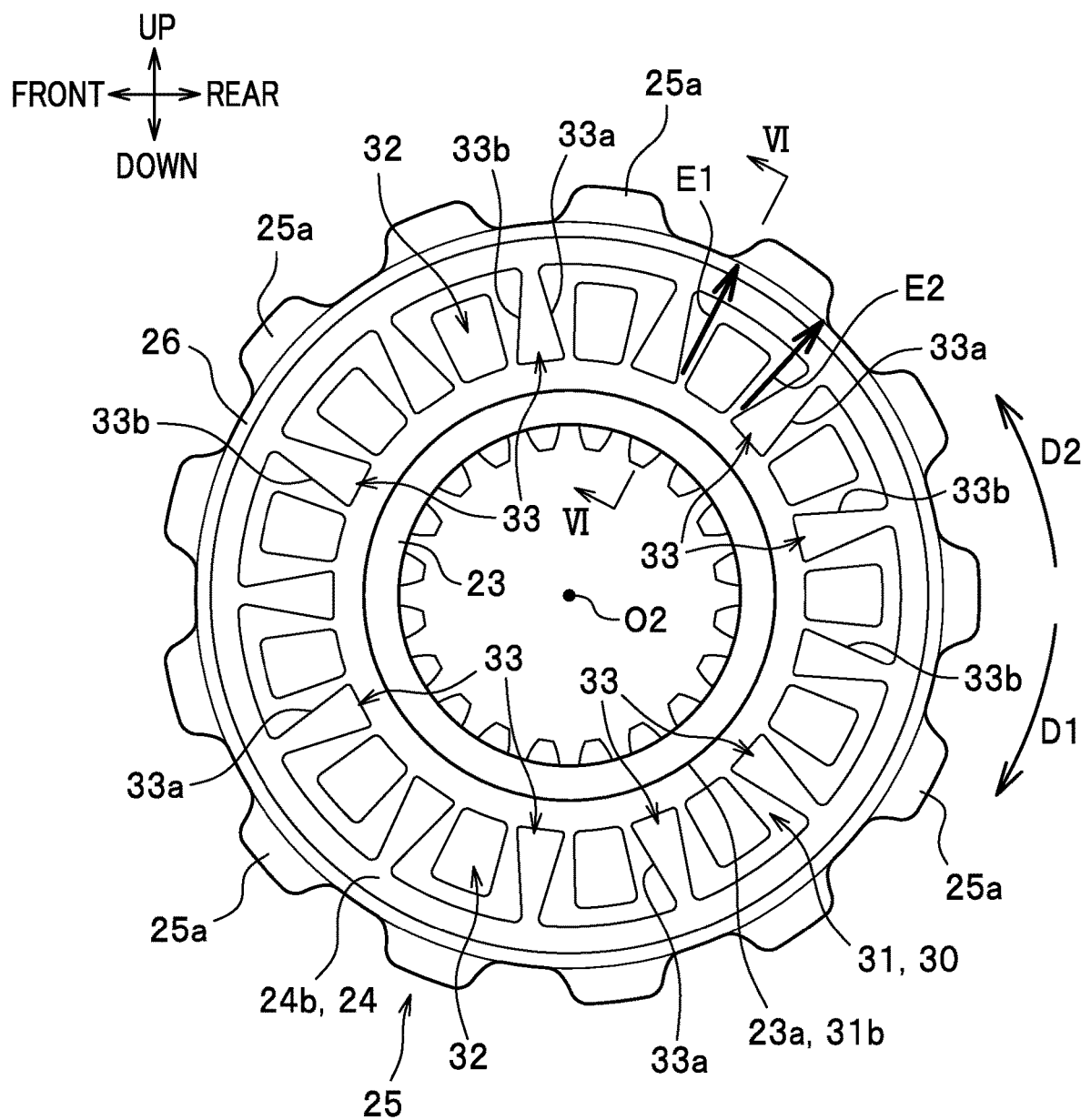
FIG. 7 is a left side view of a left-side gear of the second embodiment.

As illustrated in FIG. 7, the guide rib 33 is positioned between the second recesses 32, as viewed from the axis O2, and extends radially. Accordingly, a radially outer side of the first recess 31 is partitioned circumferentially by the guide ribs 33.

The guide rib 33 has a right-side surface 33a facing in the clockwise direction (see arrow D1 in FIG. 7) and a left-side surface 33b facing in the counterclockwise direction (see arrow D2 in FIG. 7) about the axis O2.

The right-side surface 33a is inclined more in the counterclockwise direction with an increasing distance, radially outward, from the axis O2. Further, the left-side surface 33b is inclined more in the clockwise direction with an increasing distance, radially outward, from the axis O2.

As described above, according to the second embodiment, when the differential case 11 rotates about the axis O2 due to rotation difference between the right and left wheels at different speeds, the left-side gear 121 also rotates about the axis O2.

Here, when the guide ribs 33 move in the clockwise direction (see arrow D1 in FIG. 7), the lubricating oil stored between the guide ribs 33 is guided radially outward by the right-side surfaces 33a of the guide ribs 33 (see arrow E1 in FIG. 7).

Further, when the guide ribs 33 move in the counterclockwise direction (see arrow D2 in FIG. 7), the lubricating oil stored between the guide ribs 33 is guided radially outward by the left-side surfaces 33b of the guide ribs 33 (see arrow E2 in FIG. 7).

From the description above, when the rotation difference is occurred between the right and left wheels at different speeds, the lubricating oil flows toward the sliding portion (outer circumferential surface 24b of the annular wall 24) so that the lubricating oil is continuously supplied to the meshing portion between the gear 25 of the side gear 20 and the differential pinion gear 13.

Third Embodiment

Next, a description is given of a differential 210 of a third embodiment.

Figure 8:
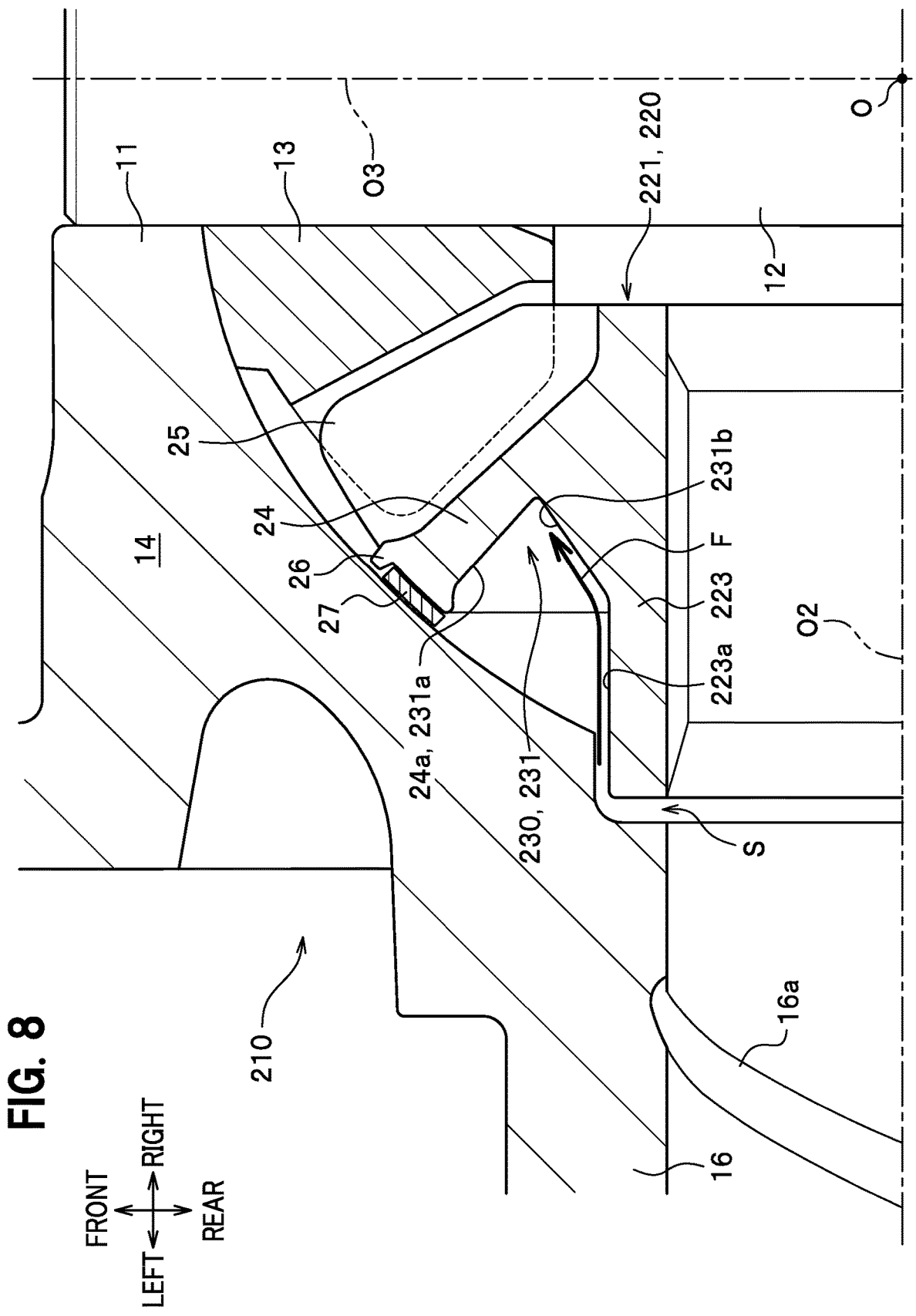
FIG. 8 is an enlarged view of a portion of the differential of a third embodiment.

As illustrated in FIG. 8, the differential 210 includes the differential case 11, the pinion shaft 12, the pair of differential pinion gears 13 (only one is shown), a pair of side gears 220 (only a left-side gear 221 is shown), and the pair of washers 27 (only one is shown). Note that the differential case 11, the pinion shaft 12, the pair of differential pinion gears 13, and the pair of washers 27 have been described in the first embodiment, and the descriptions thereof are omitted.

The left-side gear 221 includes an axial cylinder 223, the annular wall 24, the gear 25, the reinforcing rib 26, and a first recess 231 (recess 230). Note that the annular wall 24, the gear 25, and the reinforcing rib 26 have been described in the first embodiment, the descriptions thereof are omitted.

A portion (inner circumferential surface 231b) of an outer circumferential surface 223a of the axial cylinder 223, defining an inner circumference of the first recess 231, is inclined radially outward toward the right side. Accordingly, the first recess 231 has a substantially regular triangular shape in cross-section.

As described above, according to the third embodiment, even when the centrifugal force acting on the lubricating oil which has passed through the gap S is small, and the lubricating oil moves rightward along the outer circumferential surface 223a of the axial cylinder 223, the lubricating oil is guided radially outward by the inner circumferential surface 231b (see arrow F in FIG. 8). Accordingly, the lubricating oil easily flows toward the sliding portion (outer circumferential surface 24b of the annular wall 24) so that the lubricating oil is continuously supplied to the meshing portion between the gear 25 of the side gear 20 and the differential pinion gear 13.

Fourth Embodiment

Next, a description is given of a differential 310 of a fourth embodiment.

Figure 9:
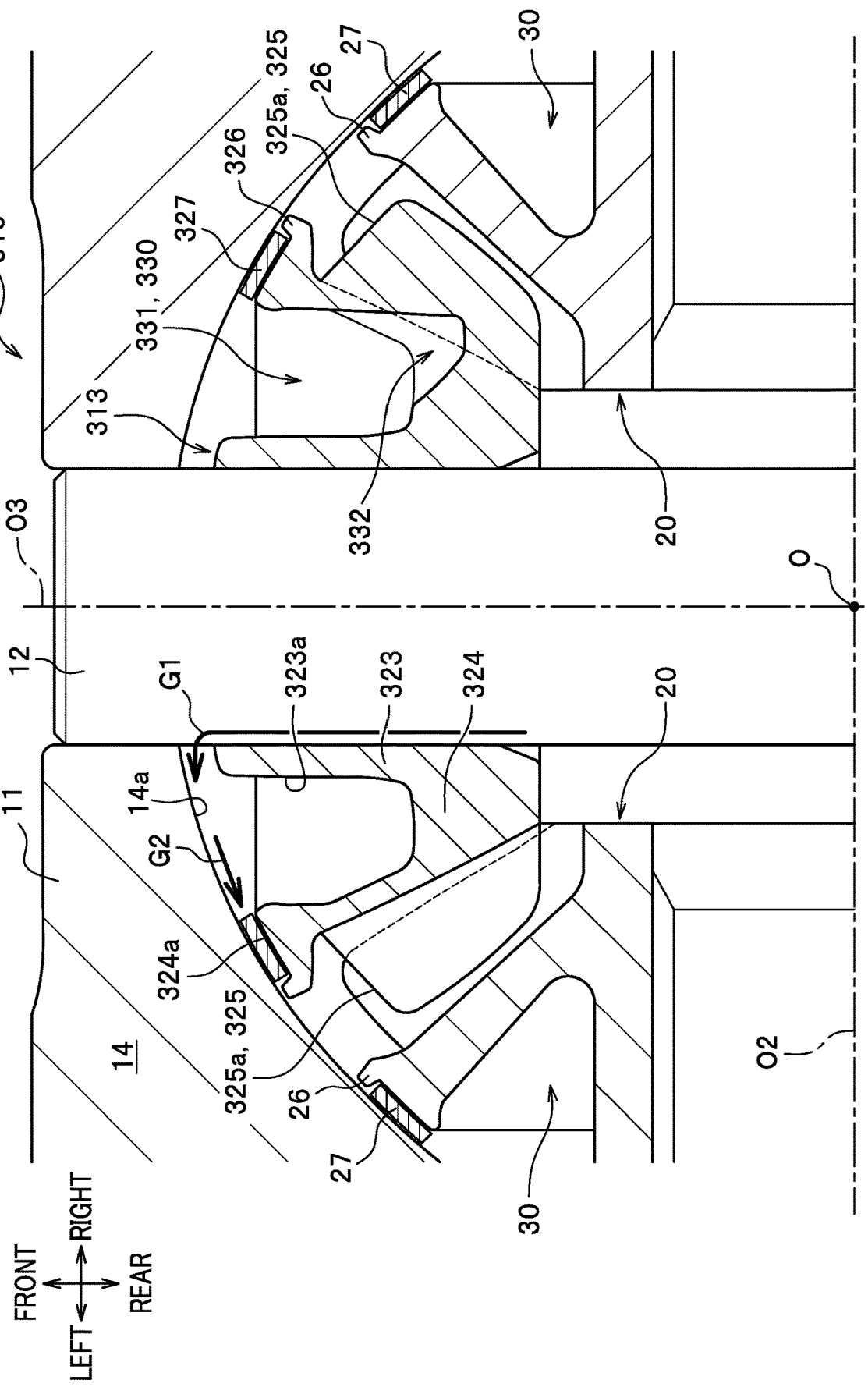
FIG. 9 is an enlarged view of a portion of the differential of a fourth embodiment.

As illustrated in FIG. 9, the differential 310 includes the differential case 11, the pinion shaft 12, a pair of differential pinion gears 313 (only one is shown), the pair of side gears 20, and the pair of washers 27. Note that the differential case 11, the pinion shaft 12, the pair of side gears 20, and the pair of washers 27 have been described in the first embodiment, and the descriptions thereof are omitted.

The differential pinion gear 313 includes a axial cylinder 323 in a shape of a cylinder about the axis O3, an annular wall 324 protruding from an outer circumferential surface 323a of the axial cylinder 323, a gear 325 meshing with the side gear 20, a reinforcing rib 326 protruding from an outer circumferential surface 324b of the annular wall 324, and a recess 330 formed by boring the annular wall 324 or the gear 325.

A washer 327, which is a sliding contact element, is interposed between an outer circumferential surface 324a of the annular wall 324 and the inner circumferential surface 14a of the differential case body 14.

Accordingly, when the side gear 20 rotates relative to the differential case 11, the outer circumferential surface 324b of the annular wall 324 slides with respect to the washer 327, or the washer 327 slides with respect to the inner circumferential surface 14a of the differential case body 14.

The recess 330 is a space formed by boring the annular wall 324, and has a first recess 331 opening forward and a second recess 322 formed by further boring the annular wall 34 rearward from an inner surface of the first recess 331.

The first recess 331 has a substantially square shape in cross-section and is continuous circumferentially about the axis O3 to form an annular shape.

The second recess 332 further extends rearward from a bottom of the first recess 331 to bore a tooth 325a. Accordingly, the second recess 332 is formed to overlap the tooth 325a of the gear 325, as viewed from the axis O3.

Next, a description is given of a flow path of the lubricating oil flowed into the differential case body 14 through an opening (not shown) of the differential case body 14.

When the differential 310 rotates about the axis O2 due to rotation difference between the right and left wheels at different speeds, the centrifugal force acts on the lubricating oil, and the lubricating oil passes through a groove (not shown) formed in the outer circumferential surface of the pinion shaft 12 to flow toward a front side of the axial cylinder 323 (see arrow G1).

Further, the washer 327 and the reinforcing rib 326 are interposed between the inner circumferential surface 14a of the differential case body 14 and the outer circumferential surface 324a of the annular wall 324, making the flow path narrow. Accordingly, an amount of lubricating oil (see arrow G2), supplied to the gear 325 over the reinforcing rib 326, is limited. As a result, the lubricating oil obstructed by the washer 327 and reinforcing rib 326 is stored in the first recess 331 and the second recess 332.

As described above, according to the fourth embodiment, the annular wall 324 is bored to form the first recess 331 so that the pair of differential pinion gears 313 are reduced in weight as compared with the conventional differential pinion gears. Meanwhile, the annular wall 324 is strengthened by the reinforcing rib 326 to maintain predetermined strength. Further, the lubricating oil is stored in the first recess 331. Therefore, the lubricating oil is continuously supplied to the sliding portion (outer circumferential surface 324b of the annular wall 324) or a meshing portion between the gear 325 of the differential pinion gear 313 and the side gear 20.

Each of the teeth 325a of the gear 325 is bored to be hollow as the second recess 332 so that the pair of differential pinion gears 313 are further reduced in weight. Further, the lubricating oil stored in the second recess 332 cools each tooth 325a from inside, resulting in excellent cooling performance.

The embodiments have been described above, but the cross-sectional shape of the first recess in the present invention is not limited to a triangular shape and may be a semicircular shape, a square shape, or the like, and is not particularly limited. Further, the recess of the present invention may only have the first recess and may not have the second recess. Still further, the outer circumferential surface of the first recess in the present invention may not be an inclined surface which is inclined radially outward toward the opening.

Further, the guide rib 33 of the second embodiment has inclined surfaces (right-side surface 33a and left-side surface 33b) at both sides, but, in the present invention, at least one of the side surfaces may be an inclined surface.

REFERENCE NUMERAL

1: final reduction gear; 10, 110, 210: differential; 11: differential case; 12: pinion shaft (shaft); 13, 313 differential pinion gear (differential gear); 14: differential case body; 15: flange; 16: left boss; 17: right boss; 20, 120, 220: side gear (differential gear); 21, 121, 221: left-side gear; 22: right-side gear; 23, 223, 323: axial cylinder; 23a: outer circumferential surface; 24, 324: annular wall; 24a: left-side surface; 24b: outer circumferential surface; 25, 325: gear; 26, 326: reinforcing rib; 27, 327: washer; 30, 230: recess; 31, 231, 331: first recess; 31a, 331a: outer circumferential surface; 31b, 231b: inner circumferential surface; 31c: opening; 32, 332: second recess; 33: guide rib; 33a: right-side surface; 33b: left-side surface; L: drive shaft (shaft)

What is claimed is:

1. A differential gear accommodated in a differential case, comprising:
   an axial cylinder having a cylindrical shape fitted onto a shaft;
   an annular wall having an annular shape protruding from an outer circumferential surface of the axial cylinder;
   a gear protruding from the annular wall on one side with respect to an axial direction of the shaft;
   a reinforcing rib protruding from an outer circumferential surface of the annular wall;
   a first recess formed by boring the annular wall and opening on an other side with respect to the axial direction of the shaft; and
   a second recess formed by boring the annular wall from an inner surface of the first recess toward the one side with respect to the axial direction,
   wherein each of a plurality of teeth forming the gear is formed hollow as the second recess.

2. The differential gear as claimed in claim 1,
   wherein the differential gear is a side gear meshing with a differential pinion gear; and
   an outer circumferential surface of an inner surface of the first recess is inclined radially outward toward an opening of the first recess.

3. The differential gear as claimed in claim 2, further comprising a plurality of guide ribs extending radially in the first recess and circumferentially partitioning the first recess,
   wherein one side surface of the guide rib, facing to one direction of rotation about the axis, is inclined with an increasing distance, radially outward, from the axis toward the other direction of rotation about the axis.

4. The differential gear as claimed in claim 3, wherein an outer circumferential surface of the axial cylinder defines an inner circumferential surface of the first recess and is formed flat in the axial direction.

5. A differential comprising the differential gear as claimed in 4.

6. A differential comprising the differential gear as claimed in 3.

7. The differential gear as claimed in claim 2, wherein an outer circumferential surface of the axial cylinder defines an inner circumferential surface of the first recess and is formed flat in the axial direction.

8. A differential comprising the differential gear as claimed in 7.

9. A differential comprising the differential gear as claimed in 2.

10. The differential gear as claimed in claim 1, further comprising a plurality of guide ribs extending radially in the first recess and circumferentially partitioning the first recess,
    wherein one side surface of the guide rib, facing one direction of rotation about the axis, is inclined with an increasing distance, radially outward, from the axis toward the other direction of rotation about the axis.

11. The differential gear as claimed in claim 10, wherein an outer circumferential surface of the axial cylinder defines an inner circumferential surface of the first recess and is formed flat in the axial direction.

12. A differential comprising the differential gear as claimed in 11.

13. A differential comprising the differential gear as claimed in 10.

14. The differential gear as claimed in claim 1, wherein an outer circumferential surface of the axial cylinder defines an inner circumferential surface of the first recess and is formed flat in the axial direction.

15. A differential comprising the differential gear as claimed in 14.

16. A differential comprising the differential gear as claimed in 1.

* * * * *